July 7, 1959   G. R. STEELE   2,893,567
STORAGE RACK CONSTRUCTION
Filed July 11, 1958   2 Sheets-Sheet 1
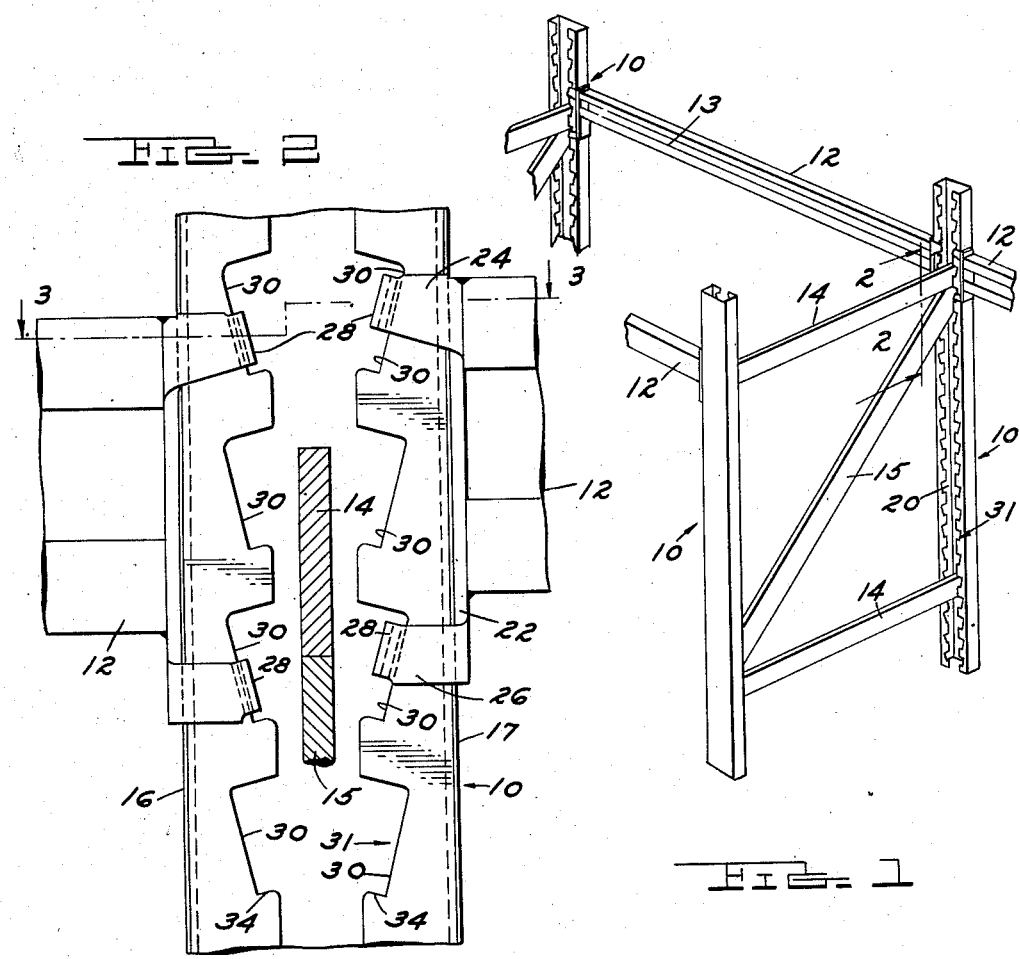
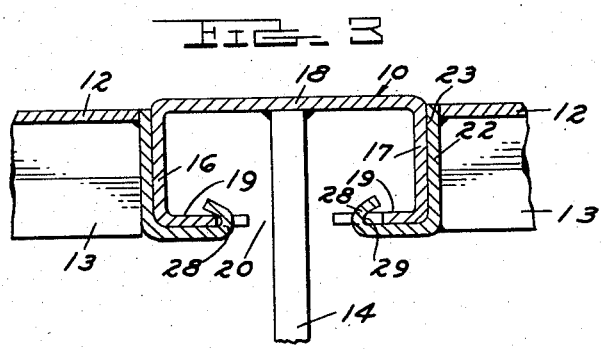
INVENTOR.
GLEN R. STEELE
BY Farley, Forster & Farley
ATTORNEYS July 7, 1959
G. R. STEELE
2,893,567
STORAGE RACK CONSTRUCTION
Filed July 11, 1958
2 Sheets-Sheet 2
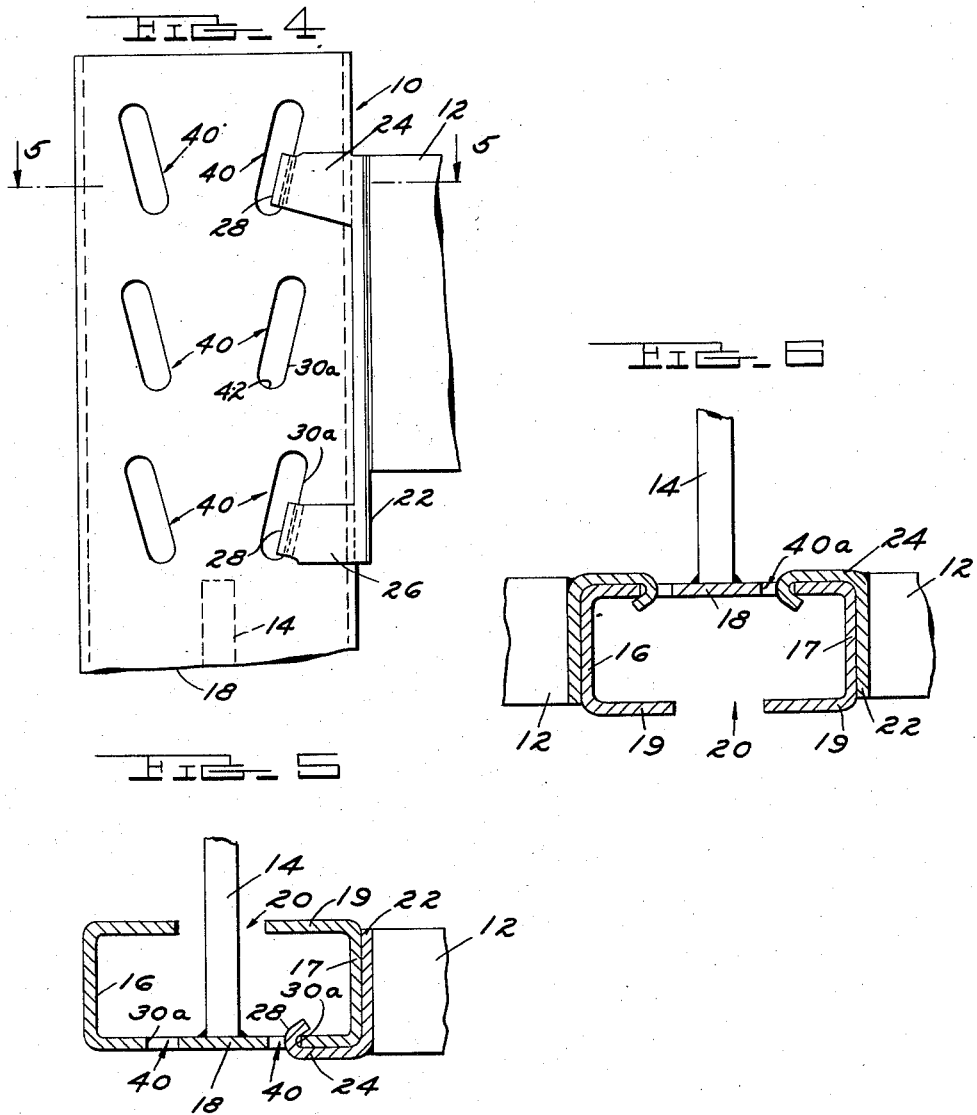
INVENTOR.
GLEN R. STEELE
BY Farley, Forster & Farley
ATTORNEYS

United States Patent Office

2,893,567
Patented July 7, 1959

2,893,567

STORAGE RACK CONSTRUCTION

Glen R. Steele, Plymouth, Mich., assignor to Bathey Manufacturing Company, Plymouth, Mich., a corporation of Michigan Application July 11, 1958, Serial No. 747,877

8 Claims. (Cl. 211—147)

This invention pertains to an adjustable storage rack construction of the knock-down kind where vertical posts or end frames and longitudinal beam members are detachably joined together, preferably with a vertically adjustable point of connection. More particularly, this invention pertains to improved connecting means between the longitudinal beams and the vertical posts which is very secure, strong and easily changed from one connecting point to another.

This invention provides for a storage rack having vertical posts which have formed therein a vertically spaced series of inclined ramp surfaces with each ramp surface defining a connecting point. Each beam member has connecting means at each of its ends. Each connecting means preferably has two vertically spaced tabs which are inclined correspondingly to the ramp surfaces, with each tab engageable with a ramp surface. The connecting means also includes a reaction plate which is disposed transversely of the length of the beam member, and which engages a reaction surface on the vertical post opposite the ramp surfaces thereof. By moving the tabs downwardly along the inclined ramp surfaces, they are wedged against the ramp surface as the reaction plate contacts the reaction surface.

Each tab preferably has an acute bend or turn at its ramp engaging end so that it partially encircles the ramp surface and becomes wedged against the ramp in both a longitudinal and transverse direction. This compound wedging action provides an extremely strong and stable connection between the connector and the ramp and yet a simple lifting action will disengage the tab from the ramp.

The ramp surface may be formed by one wall or side of an inclined slot, with the lower end of the slot defining the lower limit of movement between the beam and post for each adjustment position. Alternately, the ramp surface may be an inclined surface on each of a series of vertically spaced notches where the lower limit of relative movement is defined by the lower end surface of the notch. In either case, the length of surface contact between the tab and the ramp surface may be varied by using tabs of greater or lesser width, to suit a particular beam load condition.

Other features and advantages will become more apparent from the following description of the presently preferred embodiments of this invention illustrated in the drawings in which:

Figure 1 is a partial perspective view of a rack of this invention;

Figure 2 is an enlarged sectional elevation taken at 2—2 of Figure 1 with the right hand horizontal beam member shown in a lifted position;

Figure 3 is a section taken on the line 3—3 of Figure 2;

Figure 4 is a view similar to Figure 2 showing a second embodiment;

Figure 5 is a section taken on the line 5—5 of Figure 4; and

Figure 6 is a section corresponding to that of Figure showing a further variation of the construction.

Referring to Figures 1 to 3, the rack construction shown includes vertical posts 10 and horizontal beam members 12 which are detachably connected to the posts, and are provided with the usual inwardly facing ledge 13 for mounting decking boards or the like. A pair of posts 10 are interconnected by transverse horizontal members 14 and a diagonal member 15, forming a unit known as an end frame.

Each post 10 may be described as having four side walls (Fig. 3). Two of these side walls 16 and 17 are parallel and lie in abutting relation with the end of a beam member 12 when the parts are connected in the manner to be described. The other two side walls 18 and 19 are parallel to each other and perpendicular to the walls 16 and 17. Side wall 19 is formed with a longitudinal slot 20 and the ends of the transverse end frame members 14 and 15 are inserted in this slot and attached to the inside wall 18 as best shown in Figure 3.

Each beam member 12 is provided at its ends with connecting means consisting of a member 22 secured to the beam and transversely of the length of the beam and providing a surface 23 which abuts a side wall 16 or 17 of a post 10. Member 22 will be termed a reaction plate.

A pair of tabs 24 and 26 are formed integral with the reaction plate and project outwardly therefrom. The end 28 of each tab is bent in a reverse direction forming a hook, the inner surface 29 of which engages one of a plurality of ramp-like surfaces 30 formed on each post. The post engaging surface 29 of each tab is inclined outwardly and downwardly relative to the reaction plate 22.

Ramp surfaces 30 on the post are provided by forming a series of notches 31 in the post side wall 19 along opposite sides of the slot 20 therein. Each notch includes a lower shoulder 34 and the ramp surface 30 of each notch is inclined downwardly and outwardly relative to the adjacent post side wall 16 or 17. These side walls 16 and 17 form a post reaction surface.

A connection between an end of a beam 12 and a post is obtained by manipulating the beam to slip the ends of a pair of tabs 24 and 26 into a pair of notches of the post, and this is easily accomplished when the relative position between beam and post is that shown for the right hand beam of Figure 2. When the beam 12 is then lowered to the position shown for the left hand beam of Figure 2 the post engaging surfaces 29 of each of the tabs is brought into contact with the ramp surfaces 30 with a wedging action producing snug engagement between the beam reaction plate 22 and the post reaction surface 16 or 17. The hook end of each tab partially encircles the ramp surface 30 which it engages and the shape of these hook ends is such as to produce a compound wedging action which takes place both longitudinally and laterally of each ramp surface.

Each tab engages an appreciable length of ramp surface on the post which distributes the load, minimizes wear from assembly and disassembly of the parts and results in a more stable connection. Obviously the strength of the connection can be varied to suit particular requirements by dimensioning the parts for more or less surface engagement as well as rigidity and strength.

Figures 4 and 5 illustrate one alternate type of construction. The horizontal beam member 12 employed is the same as that previously described and the same reference numerals are used to identify the parts of its connecting means.

The vertical post 10 and transverse member 14 are interconnected in the same manner and the post 10 is a similar four sided member.

The beam supporting means of the post include ramp surfaces 30a provided by forming a series of inclined slots 40 in the beam side wall 18. Engagement and disengagement of a beam and post is accomplished in the same manner as for the previously described construction.

The lower end 42 of each slot 40 serves to limit the extent of relative downward movement between the beam 12 and post 10, this function also being performed by the shoulder 34 at the lower end of each ramp surface 30 in the construction of Figures 1 to 3.

In Figure 6 the construction is generally the same as in Figures 4 and 5 except that the position of the post has been reversed with relation to the connection between the post and the end frame transverse members 14.

Other variations of the construction which fall within the scope of the following claims are to be considered a part of the present invention.

I claim:

1. An adjustable storage rack construction of the type wherein a plurality of vertical posts are detachably interconnected by horizontal beam members characterized by connecting means at each end of said beam members, said connecting means each including a reaction plate secured to a beam member transversely of the length thereof, tab means rigidly carried by said beam member, said tab means extending longitudinally thereof and projecting outwardly of said reaction plate, said tab means including a post engaging surface inclined downwardly and outwardly relative to said reaction plate, said posts each being provided with beam supporting means comprising a vertical reaction surface extending parallel to said beam reaction plate and a ramp surface inclined downwardly and outwardly relative to said post reaction surface, said ramp surface being engageable by said beam tab means to produce wedging contact between said connecting means and beam supporting means on downward movement of said beam relative to said post.

2. A rack construction according to claim 1 wherein said tab means further includes an acutely bent hook portion for partially encircling said ramp surface so that said tab means is wedged both laterally and longitudinally against said ramp surface on downward movement of said beam relative to said post.

3. The construction of claim 1 further characterized by said post being provided with a shoulder at the lower end of said ramp surface to form a stop limiting the extent of relative downward movement between said beam and said post.

4. A rack construction according to claim 1 wherein said post includes at least two side walls, one of said side walls forming said reaction surface, and said other side wall being perpendicular thereto, said other side wall being provided with a vertical row of said ramp surfaces.

5. A rack construction according to claim 4 wherein said other side wall is provided with a row of notches, each notch including a pair of angularly related surfaces one of which is said ramp surface and the other of which forms a stop to limit the extent of relative downward movement between said beam and said post.

6. A rack construction according to claim 4 wherein said other side wall is provided with a row of elongated slots, each slot including one longitudinal surface which forms said ramp surface and one end surface which forms a stop to limit the extent of relative downward movement between said beam and said post.

7. A rack construction according to claim 1 wherein each of said vertical posts has four side walls, two of said side walls being parallel and forming reaction surfaces, a third side wall being perpendicular thereto and formed with a vertical slot therein, each facing surface of said slot being formed with a row of notches therein, each notch including a pair of angularly related surfaces one of which is said ramp surface and the other of which forms a stop to limit the extent of relative downward movement between said beam and said post.

8. A rack construction according to claim 7 further characterized by transverse members interconnecting a pair of posts to form a rack end frame, said transverse members projecting though the said slot in the said third side wall of each of said pair of posts, and means rigidly connecting said transverse members to said fourth side wall of each of said pair of posts, said fourth side wall being parallel to said third side wall.

References Cited in the file of this patent

UNITED STATES PATENTS

| Re. 24,535 | Franks | Sept. 16, 1958 |
| 2,008,087 | Stromberg | July 16, 1935 |
| 2,772,846 | Skar | Dec. 4, 1956 |